United States Patent [19]

Straeten et al.

[11] 4,030,961
[45] June 21, 1977

[54] DEVICE FOR ASSEMBLING GLASS SHEETS AND LAYERS OF PLASTIC MATERIAL

[75] Inventors: Franz-Josef Straeten, Aachen; Rudolf Pelzer, Herzogenrath; Karl-Josef Feiten, Wuerselen, all of Germany; Wilhelm-Josef Stevens, Kirchrath, Netherlands

[73] Assignee: Saint-Gobain Industries, Neuilly-sur-Seine, France

[22] Filed: July 31, 1975

[21] Appl. No.: 600,826

[30] Foreign Application Priority Data

Aug. 14, 1974 France .............................. 74.28189

[52] U.S. Cl. .................. 156/580; 100/155 G; 100/170; 100/176; 100/211; 156/555
[51] Int. Cl.² .................... B30B 3/04; B30B 9/22
[58] Field of Search ............... 156/580, 582, 106; 100/155 G, 170, 176, 211, 162 B, 163 R, 163 A, 164; 29/113 R, 113 AD, 123

[56] References Cited

UNITED STATES PATENTS

| | | | |
|---|---|---|---|
| 1,563,130 | 11/1925 | Weston | 100/176 |
| 2,673,168 | 3/1954 | Pascoe et al. | 156/582 |
| 2,685,548 | 8/1954 | Drozdowski | 156/582 |
| 2,729,581 | 1/1956 | Pascoe et al. | 156/582 |
| 2,792,152 | 5/1957 | Crowley et al. | 29/123 |
| 2,828,823 | 4/1958 | Mounce | 29/113 R |
| 3,056,440 | 10/1962 | Mello | 100/170 |
| 3,389,450 | 6/1968 | Robertson | 100/170 |
| 3,804,707 | 4/1974 | Mohr et al. | 100/211 |

*Primary Examiner*—Douglas J. Drummond
*Assistant Examiner*—Basil J. Lewris
*Attorney, Agent, or Firm*—Pennie & Edmonds

[57] ABSTRACT

The invention relates to an apparatus for the assembly or permanent adhesion of sheets of glass with sheets of plastic material, comprising a pair of pressure rollers between which one passes the layers superimposed for assembly, which rollers being provided with, on a length corresponding at least with the size of the layers to be assembled, a hollow elastic covering which is filled with a fluid under pressure. In each roller the elastic covering is mounted to the roller (in a manner similar to a vehicle tire) by means of two rim-like elements, one of which is movable axially of the roller toward and from the other such rim. The elastic covering is like a tire but oversize in the axial direction. By adjusting one of the rims relative to the other, or the fluid pressure or both, the shape of the elastic tire-like member may be modified within wide limits to accommodate sheets of glass having complex, compound curves.

11 Claims, 4 Drawing Figures

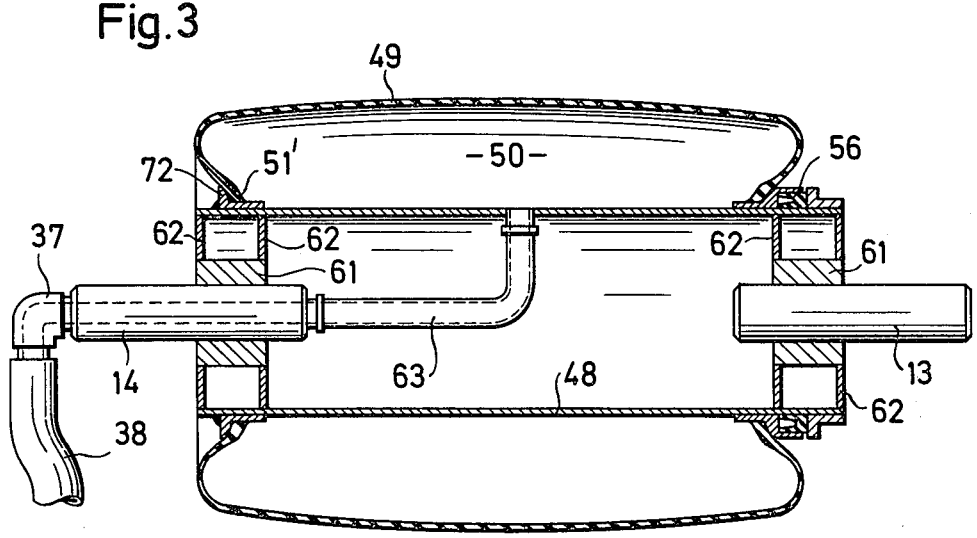
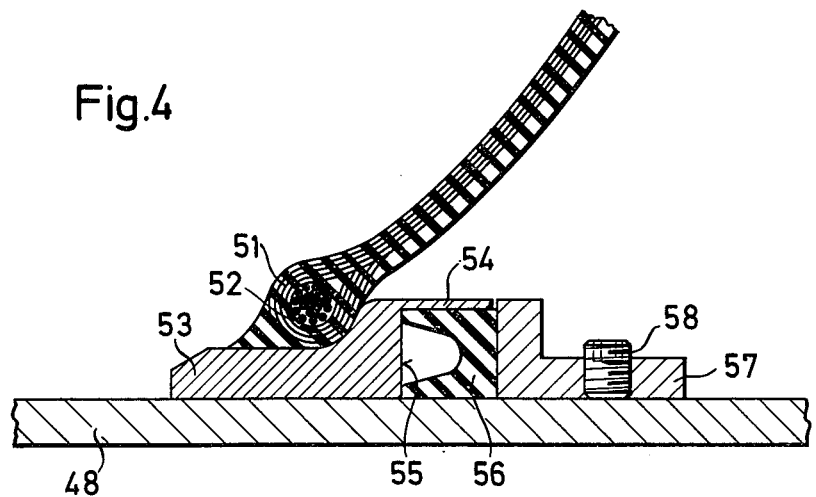

ID FOR ASSEMBLING GLASS SHEETS AND LAYERS OF PLASTIC MATERIAL

PRIOR ART

In French Pat. No. 1,120,145 is described an apparatus of this type. The rollers consist of hollow steel cylinders, provided with holes, on which has been mounted a rubber outer layer, the ends of which layer project out over the ends of the steel cylinder. The projecting parts of the layer are joined tightly with an elastic covering by intermediary pieces in the form of a ring. The space defined by the said rubber layer of the steel cylinder and the said elastic covering is kept under pneumatic pressure.

The rollers of this known type are proposed for the lamination of flat or rounded cylindrical sheets of glass. The windshields of automobiles which represent an important portion of laminated glass have however, in general, a spherical roundness more or less extreme. It is not possible to treat glass such as this with cylindrical pressure rollers as is discussed hereafter.

BRIEF DESCRIPTION OF THE INVENTION

The object of this invention is to provide pressure rollers of the type hereunder described but which, on the one hand, are suitable for the treatment of spherically rounded sheets of glass, and on the other hand, permit the modification of the form of the rollers such that the same pair of rollers can be used for the treatment of glasses of different curvatures.

The problem is resolved according to the invention by the fact that the covering of the roller employed is like a tire on a vehicle which is oversized in its axial direction and is mounted on a cylindrical drum by means of rims of which at least one is axially movable on the said drum.

The rollers according to the invention present the remarkable advantage that, because of their structure, they are very elastic, even at their ends, so that they do not present, in these places, any hard spots, nor any irregularity. Thanks to this structure and because of the movability of the rims, the form of the covering can be modified and adapted within wide limits to the form of the sheets to be assembled, in such a way that the possibilities for their use is much greater than that of the previously known rollers. As a result of the great elasticity of the rollers even at the ends and as a result of the equal pressure applied by the rollers, the rollers according to this invention ar suitable for the pressing of articles made of sheets of glass and plastic material in which one or several layers of plastic material are applied on the outside of a curved single sheet or stack.

The manufacture of such sheet articles is particularly difficult when one wishes to obtain a transparency free from optical flaws such as is the case with vehicular windshields. None of the pressure roller structures previously known permitted one until now to obtain a satisfactory pressing with regard to such optical flaws. From this fact, the degasification and the pressing of such layered articles has been accomplished until now exclusively by treatment under vacuum or even, before the treatment under pressure, one had to place on the sheet of plastic material a protective sheet, notably a sheet of glass which had to be removed after the pressing was finished. The two processes are very costly. The use of a protective sheet was otherwise inconvenient in that its separation from the finished layered article presented great difficulties.

It has been ascertained that, thanks to the rollers constructed according to this invention, one exerts such an even pressure (even on the ends of the rollers) that these could be used with good results for the adhesion of layers of plastic material on both flat and rounded glass sheets. It is then possible to accomplish, in this manner, not only the initial assembly of sheets of glass but equally the permanent adhesion of the layered article. This represents an important simplification in the manufacture of these articles. The structure of such a pressure roller covering corresponds to that of a vehicle tire, that is to say, comprises an underlying structure called the "casing" covered with a layer of natural or synthetic rubber facing. The surface of the facing layer can present a light roughness. One obtains for example, good results when the depth of the roughness in the facing layer is about 50 to 200 microns. In the interior of the covering, is provided an air chamber into which one injects the fluid under pressure, which is well-known in air theory. However, it is equally possible to use another fluid under pressure.

DESCRIPTION OF THE DRAWINGS

Other particulars and characteristics of the invention are emphasized in the following description which is to be read with reference to the attached drawings, in which:

FIG. 3 represents a roller cut in half longitudinally; and

FIG. 4 represents a detail of FIG. 3 in enlarged scale.

DESCRIPTION OF PREFERRED EMBODIMENT

Figure 1:
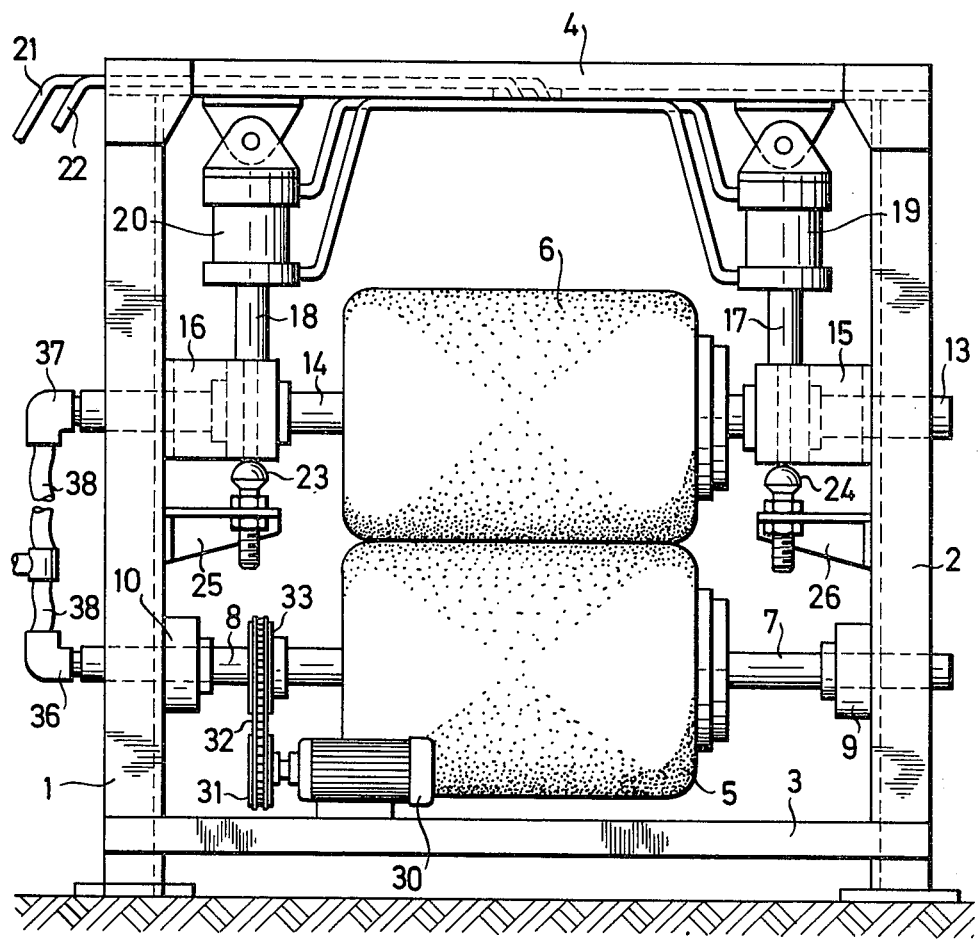
FIG. 1 represents a front elevation of a roller apparatus according to the invention.

The mount supporting the rollers is made up of lateral supports 1 and 2, a transverse base 3 and an over brace 4.

In this frame is mounted a pair of rollers 5 and 6. The lower roller 5 is mounted for rotation in the bearings 9 and 10 by means of the half shafts 7 and 8 respectively. The bearings 9 and 10 are fixed on the mounts 2 and 1 respectively of the support. The top roller 6 is mounted in a similar manner by half shafts 13 and 14 in bearings 15 and 16 respectively. The bearings 15 and 16 are themselves mounted at the end of piston riods 17 and 18 respectively actuated by the jacks 19 and 20 respectively, in such a way that the roller 6 can be raised or lowered by the action of the jacks. The pressure fluid is sent to the jacks under pressure by conduits 21 and 22. To fix the position of the roller 6 in a precise manner, there is provided block stops 23 and 24 threaded to be regulatable in the consoles 25 and 26. The bottom roller 5 is driven by a motor 30 by intermediary sprockets 31, 33 and chain 32. A drive for the top roller is generally unnecessary. The two rollers are strongly pressed against each other in the absence of a stack of sheets between the two, such that the top roller 6 is driven by the rotation of the bottom roller 5.

The half shafts 8 and 14 are hollow and serve for the introduction of fluid under pressure in the covering of their respective rollers. The connection between the conduit 38 containing fluid under pressure and the half shafts 8 and 14 is effected by the turning joints 36 and 37 which maintain a fluidtight seal between conduit 38 and shafts 8 and 19 while permitting the shafts 8 and 14 to rotate.

Figure 2:
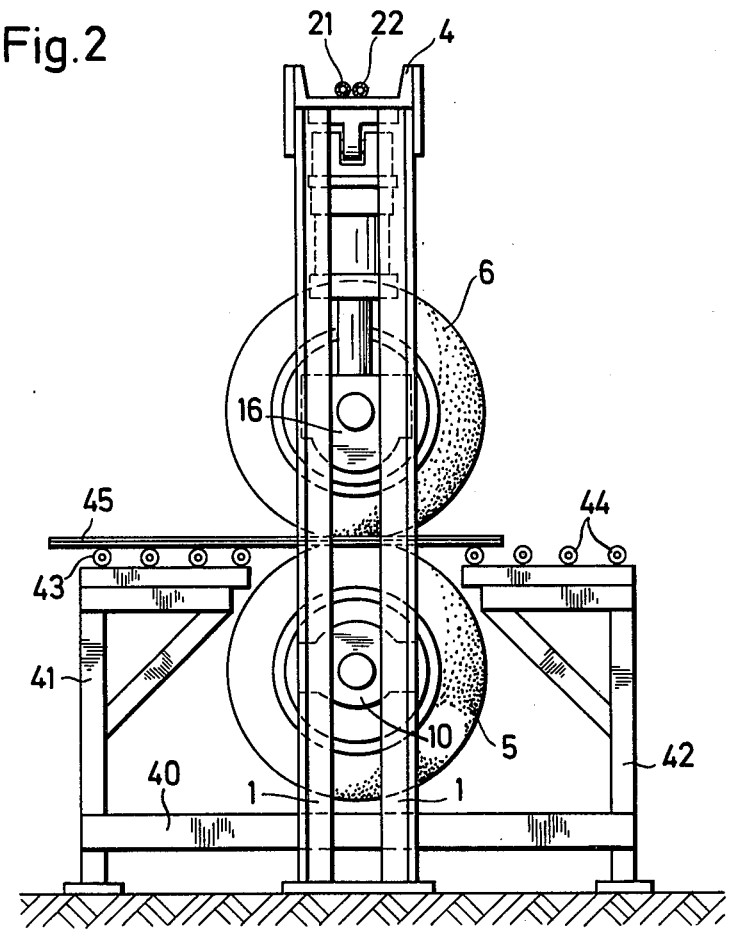
FIG. 2 is a side elevation of the same apparatus.

In FIG. 2, there is provided in front and behind the crack between the two rollers, small roller supports 43 and 44 mounted on the stand 40–41–42 for the purpose of transporting the stack 45 between the two rollers. In the case of the pressing of curved sheets of glass, the small roller control is adjusted to the curvature or the form of the sheets of glass. The structure of the top roller 6 which is in all respects identical to that of the bottom roller 5 is represented in FIGS. 3 and 4. Each roller consists of a cylindrical drum 48 with a diameter of 25 to 40 cm. which serves as a wheel in carrying the covering 49 of the roller. The covering 49 forms with the drum 48 a cavity 50 filled with fluid under pressure. The covering 49 has an exterior diameter of approximately 60 cm. and a length of approximately 1 m. measured along the axial direction of the drum, such that the shapes and dimensions of curves usually encountered may be fully accommodated by the rollers. The thickness of the elastic covering around the periphery is 3 to 5 mm. The structure of the covering 49 corresponds more or less to that of a tire. At the base 51 of the covering there is provided a steel cable 52 around which is wrapped several cloth plys which constitute the casing of the covering.

Advantageously the rollers have a diameter of at least 30 centimeters, and preferably in the range of from about 40 to about 80 centimeters.

The casing supports an intermediate structure of padding containing little cloth which is retained in place by the top layer which is made of either natural or synthetic rubber. Good results have been obtained with natural rubber with the following characteristics: hardness shore: 68°, modulus of elasticity E:29 kg/cm². The outer rubber surface is preferably lightly roughened to prevent adhesion of the curved surfaces of the rollers to the workpiece. The depth of the texture of the roughness can be as much as 50 to 200 microns. If necessary, the prevention of adhesion may be further insured by the use of a pulverized slipping agent such as talc. In cases where spherical bends must be pressed between the rollers, easy movement of the sheets is made possible by the slipping agent.

The casing, the intermediate structure and the covering layer making up the elastic covering of the rollers must be as homogeneous as possible, that is to say, without local thickening without difference in material, etc., in a way so as to obtain a very even pressure on the stack to be pressed.

At one end of the drum 48, the rim 72 is fixed to the drum. At the other end of the drum the rim 53 is capable of sliding on the drum. This sliding not only permits easy mounting of the covering 49 on the drum but it also permits (by slideably adjusting the rim 53) modification of the shape which the covering 49 will take under various inflation pressures. Thus the shape of the covering can be modified, within certain limits, to different shapes of bends and curves to be treated by adjusting either or both of:

1. the axial position of rim 53, or
2. the fluid pressure in the cavity 50.

The rim 53 includes an annular flange 54 defining a groove 55 with the exterior surface of the drum 48. In this ring-shaped groove a joint 56 is located. The attachment ring 57 which is fastened in position on the drum by the bolt 58, compresses the joint 56. The half axles 13 and 14 are bound to the drum 48 by rings 61 and clamping rings 62. The half axle 14 is hollow so that it can permit the pressurized fluid to pass through it. The pressure conduit 63 puts the hollow half axle 14 in communication with the internal space 50 of the roller covering. The conduit 38, of course, is provided with connection to a source (not shown) of fluid under pressure. While air is the presently preferred fluid, other gases or liquids including water may be utilized.

Excellent results are obtained when the pressure in the rollers is in the order of 0.5 to 2 atmospheres. It is notable that, even for higher pressures, the forces of compression are found to be extremely homogeneous and thus unfavorable influences on the stack to be laminated are avoided.

We claim:

1. Apparatus for the assembly of sheets of glass with sheets of plastic material comprising a pair of rollers between which a plurality of sheets pass, said rollers being provided with a hollow elastic covering with a length corresponding at least to the width of the sheets to be assembled, said hollow elastic covering having an internal space for receipt of a fluid under pressure and inflation thereby, said elastic covering being elongated in the axial direction and mounted on a cylindrical drum by rim means affixed to respective ends of the covering, at least one of said rim means being movably adjustable longitudinally of said drum so that the shape of the covering can be modified to accommodate sheets of glass having different shapes of bends and curves.

2. The apparatus according to claim 1 in which said movable rim forms with said drum a groove, a joint positioned in said groove, said joint being pressed against said drum and said rim by a ring fixed in selected position on said drum.

3. The apparatus according to claim 1 in which said rollers have a diameter of at least 30 centimeters.

4. The apparatus according to claim 3 in which said diameter is in the range of from about 40 to about 80 centimeters.

5. The apparatus according to claim 1 in which said covering comprises a casing having an outer layer of natural or synthetic rubber, the surface of said outer layer being textured.

6. The apparatus according to claim 5 in which said texture of said natural or synthetic rubber has a depth of from about 50 to about 200 microns.

7. The apparatus according to claim 1 in which said internal space within the covering is filled with pressurized gas.

8. The apparatus according to claim 1 in which said internal space within the covering is filled with a liquid under pressure.

9. The apparatus according to claim 1 in which during assembly of sheets of glass with a spherical or compound curvature the rollers assume, in the longitudinal direction, a concave or convex curvature according to the shape of the curves in the glass.

10. The apparatus according to claim 1 in which the pressure in said internal space of said rollers is adjustable to accommodate various shapes of the glass sheets.

11. Apparatus for the assembly of sheets of glass with sheets of plastic material comprising a pair of rollers between which said sheets pass, said rollers each having a hollow elastic covering with a length corresponding at least to the width of the sheets to be assembled and with reentrant ends, said elastic covering being mounted on a cylindrical drum by rim means affixed to respective reentrant ends of the covering, at least one of said rim means being movably adjustable longitudinally of said drum so that the shape of the covering can be modified to accommodate sheets of glass having different shapes of bends and curves and means for supplying to the internal space of said hollow elastic covering a fluid under pressure to inflate the covering.

* * * * *